(12) United States Patent
Scherr

(10) Patent No.: US 7,134,138 B2
(45) Date of Patent: Nov. 7, 2006

(54) METHODS AND APPARATUS FOR PROVIDING SECURITY FOR A DATA STORAGE SYSTEM

(75) Inventor: Allan L. Scherr, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 738 days.

(21) Appl. No.: 09/784,381

(22) Filed: Feb. 15, 2001

(65) Prior Publication Data

US 2002/0112178 A1 Aug. 15, 2002

(51) Int. Cl.
*H04L 9/32* (2006.01)
*H04L 9/00* (2006.01)
*H04K 1/00* (2006.01)
*G04F 7/04* (2006.01)

(52) U.S. Cl. ............... 726/2; 726/3; 726/4; 726/9; 713/159; 713/185

(58) Field of Classification Search ........... 713/200, 713/159, 172, 185, 183; 705/65; 380/229; 235/382; 707/10; 726/27; 711/113; 710/107
See application file for complete search history.

(56) References Cited

U.S. PATENT DOCUMENTS

| 5,506,961 | A | * | 4/1996 | Carlson et al. ............. 713/200 |
| 5,619,671 | A | * | 4/1997 | Bryant et al. ............... 711/202 |
| 6,044,154 | A | * | 3/2000 | Kelly ......................... 713/155 |
| 6,161,182 | A | * | 12/2000 | Nadooshan ................. 713/172 |
| 6,279,111 | B1 | * | 8/2001 | Jensenworth et al. ....... 713/200 |
| 6,314,425 | B1 | * | 11/2001 | Serbinis et al. ............... 707/10 |
| 6,330,585 | B1 | * | 12/2001 | Casper et al. ............... 709/200 |
| 6,502,165 | B1 | * | 12/2002 | Kishi et al. ................. 711/114 |
| 6,567,853 | B1 | * | 5/2003 | Shomler ..................... 709/229 |
| 6,594,698 | B1 | * | 7/2003 | Chow et al. ................. 709/226 |
| 6,609,165 | B1 | * | 8/2003 | Frazier ......................... 710/36 |
| 6,609,180 | B1 | * | 8/2003 | Sanada et al. ............... 711/152 |
| 6,738,821 | B1 | * | 5/2004 | Wilson et al. ............... 709/230 |
| 6,742,090 | B1 | * | 5/2004 | Sanada et al. ............... 711/152 |
| 6,754,696 | B1 | * | 6/2004 | Kamath et al. ............. 709/213 |
| 2003/0120600 | A1 | * | 6/2003 | Gurevich ..................... 705/50 |
| 2004/0230698 | A1 | * | 11/2004 | Oeda et al. ................. 709/245 |

OTHER PUBLICATIONS

J. Satran, D. Smith, K. Meth, IBM, Internet Small Computer Systems Interface (iSCSI) RFC 3720, Jul. 10, 2000, IBM, p. 1-225.*

* cited by examiner

*Primary Examiner*—Hosuk Song
*Assistant Examiner*—Linh L D Son
(74) *Attorney, Agent, or Firm*—BainwoodHuang

(57) ABSTRACT

The invention is directed to techniques for providing security in data storage systems that provide access to data by other systems, such as host computer systems. A data access manager generates access tokens that it assigns to storage locations that store data in one or more data storage assemblies in the data storage system. A host that makes a request to access specific storage locations having data must obtain an access token associated with those storage locations from the data access manager, and provide the access token with the request to the data storage system. The data storage system then authenticates the request based on the access token.

27 Claims, 10 Drawing Sheets

28 DATA ACCESS MANAGER (E.G., NETWORK SWITCH)

41 TOKEN TABLE

| 72-A DATA STORAGE ASSEMBLY IDENTIFIER | 74-1 ADDRESS RANGE | 40-1 ACCESS TOKEN |
| --- | --- | --- |
| | 74-2 ADDRESS RANGE | 40-2 ACCESS TOKEN |
| | 74-3 ADDRESS RANGE | 40-1 ACCESS TOKEN |

| 72-B DATA STORAGE ASSEMBLY IDENTIFIER | 74-4 ADDRESS RANGE | 40-3 ACCESS TOKEN |
| --- | --- | --- |
| | 74-5 ADDRESS RANGE | 40-1 ACCESS TOKEN |
| | 74-6 ADDRESS RANGE | 40-2 ACCESS TOKEN |

| 76-A HOST IDENTIFIER | 43-1 HOST TOKEN |
| --- | --- |
| 76-B HOST IDENTIFIER | 43-2 HOST TOKEN |

FIG. 10

METHODS AND APPARATUS FOR PROVIDING SECURITY FOR A DATA STORAGE SYSTEM

BACKGROUND OF THE INVENTION

Historically, a computer can make a request to access a remote electronic device (e.g., data storage device) over a communications connection, such as a channel, local area network (LAN) or internet protocol (IP) network, such as the Internet. The access request can be to obtain services and/or data by interacting with a software application on the remote device. Alternatively, the access request can be a request only to access data stored on the remote device (e.g., read or write data stored on a disk within a remote data storage device). The remote device can have a security mechanism to prevent access by unauthorized users (e.g., hackers) to the remote device. One conventional approach is for a user of a device to log into the device by providing a user identification (ID) and password. For example, when an individual uses an automatic teller machine (ATM), the individual must insert an ATM card with an electronically encoded version of the individual's account number and manually provide a password. Then the individual can make a transaction (e.g., withdraw money) which in turn results in a change to the individual's data records for their bank account, which typically reside in a data storage device that is remotely located from the ATM.

Alternatively, a software application can seek access to the remote device without the direct involvement of a human user, for example, by providing a password on behalf of the user to the remote device. For example, the user wishes to use a local client (e.g., client application executing on the client's personal computer) to access a remote application (remote software application executing on a remote server). The user can indicate a desire to access the remote software application to the local client, which then sends a password previously entered by the user to the remote application. Thus, the user can then gain access to the remote application without typing in a password every time the user wishes to gain access to it.

One example of such an approach is the Kerberos system, an authentication system developed by the Athena Project at the Massachusetts Institute of Technology. In this system, a user enters a password into a local computer at the beginning of the day that provides access to one or more remote software applications. The user's computer transmits the password to an authenticating computer that then returns a Kerberos ticket that is valid for a period of time (e.g., 24 hours). Later in the day, if the user wishes to access one of the remote software applications requiring the password, the user indicates a desire to do so to his/her local computer, and the local computer transmits the ticket to the remote software application, which provides access to the remote software application.

In another conventional approach, a dedicated channel connects two electronic devices (e.g., over a cable connecting the two electronic devices). For example, a host computer makes a request to access data in another a data storage device by sending a command over the channel (e.g., to read data). The host computer usually does not use a password, because the channel is typically based on a direct physical connection between the host computer and the data storage device and is secure unless the physical connection is compromised (e.g., a hacker has direct access to the cable to tap or monitor communications over the cable). One known approach for channel communications is SCSI (Small Computer System Interface) based on a high speed interface for transferring device-oriented, block access commands between electronic devices (such as computers and data storage devices).

SUMMARY OF THE INVENTION

Conventional approaches to securing data typically require the manual entry of a password or a secure communications connection (e.g., within one computer system or a channel between two electronic devices). For example, a conventional ATM system requires that the user provide both a physical security device (his/her ATM card) and a manually entered password. In another conventional example, an authentication system, such as Kerberos, requires that the user manually enter a password in order for the user's computer to receive a Kerberos ticket (as described earlier).

In a further conventional example, SCSI channel communications are typically based on a direct connection (e.g., cable providing a direct connection between a host computer and a storage data device). Conventional SCSI communications provide for rapid, device-oriented, data block based communications (e.g., based on a read or write command directed to a range of disk addresses on a specific data storage device). Such communications can also be adapted for non-channel communications, such as those using a transport protocol, such as TCP (Transmission Control Protocol) used in IP networks such as the Internet. However, device-oriented, block based commands are poorly suited for use with conventional transport protocols, because these commands do not typically provide for security and authentication mechanisms. A remote data storage device receiving such a command from a remote host computer does not typically have a mechanism for verifying the specific command and authenticating the access to the specific data (e.g., range of disk addresses on the data storage device) that the command requests.

In contrast to the conventional approaches described above, which require user passwords and/or a secure environment (e.g., use of a dedicated cable between a computer system and a data storage system), the invention is directed to techniques for providing security for accessing data in a data storage system over a network by associating tokens with specific storage locations (e.g., range of disk addresses) on the data storage device. The association of tokens with specific storage locations enables a computer system to include an access token in a data access request in order to obtain access to data in the storage locations. The use of such tokens can be implemented on a device-oriented communications arrangement in order to provide for a system that provides for authentication of device-oriented, block based commands (e.g., SCSI commands) that may be transmitted over connections (e.g., over the Internet) other than channel connections or circuits within one computer system.

In one embodiment, the invention is directed to a data storage system (e.g., storage area network) for accessing a set of data, including a data access manager (e.g., network switch), a network connection, and a data storage assembly. The data access manager establishes a plurality of tokens for accessing the set of data. The network connection is in communication with the data access manager and a data storage assembly. The data storage assembly includes (i) a set of storage locations (e.g., one or more ranges of disk addresses) that stores the set of data, and (ii) a control circuit. The control circuit is configured to receive from a host in communication with the data access manager over the network connection (i) a request to access the set of data and (ii) a first access token of the plurality of tokens that provides access to the set of data stored in the set of storage locations in the data storage system. The control circuit is also configured to generate an authorization signal that controls access to the set of data based on the first access token and a second access token of the plurality of tokens. The control circuit associates the second access token with the set of storage locations. The control circuit is also configured to produce a response signal that provides a response to the request over the network connection to the host based on the authorization signal. Thus, the data storage assembly relies on the access tokens to authenticate a request from a host. For example, the data storage assembly approves a request to read data from the host based on the access tokens, and then, in the response signal, provides the requested data to the host.

In another embodiment, the control circuit is configured to perform a comparison of the first access token to the second access token associated with the set of storage locations. If the comparison indicates that the first access token and the second access token are identical, the control circuit is configured to produce an access approval signal that provides access to the set of storage locations. If the comparison indicates that the first access token and the second access token are not identical, the control circuit is configured to produce an access failure signal that indicates a denial of access to the set of storage locations. Thus, the control circuit authenticates a request from the host if the two access tokens are identical, and denies access if the two access tokens are unequal.

In an additional embodiment, the data access manager includes a processor and a memory. The memory includes a data access manager application. The processor operates in accordance with instructions of the data access manager application stored in the memory to establish the plurality of tokens for accessing the set of data. The instructions of the data access manager application configure the processor to associate, prior to receiving the first access token, the second access token with the set of storage locations in response to a request from a host to store the set of data, to allocate the set of storage locations in the data storage assembly to receive the set of data in response to the request to store the set of data, while tagging each storage location with the second access token, and to provide to the host the set of storage locations and a first access token based on the second access token. For example, the data access manager (i.e., the processor acting under the directions of the data access manager application) allocates a range of disk addresses large enough to accommodate the amount of data indicated in the request from a host), associates an access token with the range of disk addresses, and returns the range of disk addresses and access token associated with them to the host. Then the host can send a command to the data storage assembly that includes the disk address ranges and the access token, directing the data storage assembly to store the data in those address ranges.

The data access manager application, in another embodiment, includes further instructions that configure the processor to generate, prior to associating the second access token with the set of storage locations, an initial access token of the plurality of tokens in response to the request to store the set of data in the data storage system. The instructions also configure the processor provide a first copy (i.e., for the host) of the initial access token as the first access token to the host over the network connection, and to provide a second copy (i.e., for the data storage assembly) of the initial access token as the second access token to the data storage assembly. Thus, when receiving a request to store data, the data access manager first generates a new or initial access token (e.g., by running a random number generator to produce a random number to use as the access token) for a specific request to be associated with a range of disk addresses in the data storage assembly. For example, the data access manager directs the data storage assembly to associate the initial access token with the range of disk addresses, receives a confirmation from the data storage assembly, and then provides a copy of the initial access token to the host with the range of disk addresses to be used by the data storage assembly in storing the data.

In one embodiment, the invention is directed to a host for requesting access to a set of data stored in a set of storage locations in a data storage system. The host includes a memory including a host application, an input/output controller, and a processor in communication with the memory and the input/output controller. The processor operates in accordance with instructions of the host application stored in the memory to request access to the set of data. The instructions of the host application configure the processor to generate a request to access the set of data stored in the set of storage locations, to provide through the input/output controller to the data storage system the request to access the set of data and a first access token that provides access to the set of data, and to obtain through the input/output controller from the data storage system a response signal that provides a response to the request based on the first access token and a second access token associated with each storage location. For example, the host can receive back a response signal providing a range of disk addresses and the access token associated with those disk addresses.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

The techniques of the invention may be employed in data storage systems and components of such systems, as well as other computer-related systems and devices, such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10 shows a block diagram of a token table in a data access manager configured in accordance with the invention.

DETAILED DESCRIPTION

The invention is directed to techniques for providing security for data in data storage systems accessed by other systems, such as host computer systems. In particular, a data storage system (e.g., storage area network or SAN) provides for authentication of device-oriented, data block based commands (e.g., SCSI commands) that can be transmitted over connections (e.g., the Internet) other than circuits within one computer system. Such an approach provides for tokens to be associated with specific addresses (e.g., range of disk addresses) on one or more data storage devices. For example, a data access manager (e.g., network switch) associates specific access tokens with disk address ranges for data in a data storage device, and provides the access token to a host computer. The host computer then provides the access token to the data storage device when requesting access to the data in those disk address ranges. Thus, the data storage device is able to prevent an unauthorized access by a host computer trying to access data if that host computer does not provide the access token associated with the disk addresses for that data. In addition, the techniques provide for additional security features by providing tokens used as identifiers to authenticate electronic devices, such as a master token used to identify and authenticate a data access manager that creates and distribute tokens and host tokens used to identify and authenticate host computers that initiate the device-oriented commands.

Figure 1:
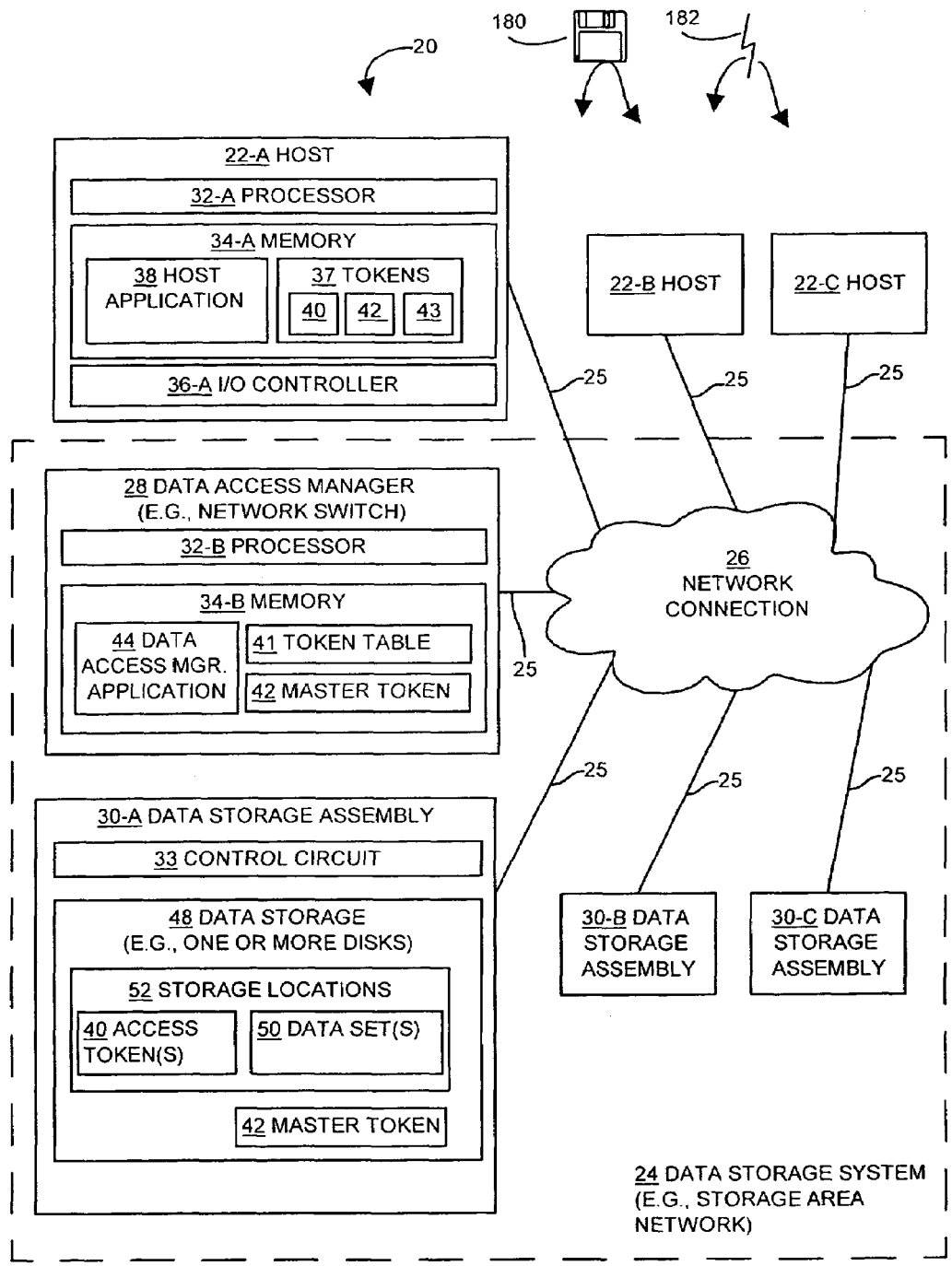
FIG. 1 shows a block diagram of a computer network suitable for use with the invention.

FIG. 1 shows a block diagram of a computer network 20 suitable for use by the invention. The computer network 20 includes hosts 22-A, 22-B, and 22-C (referred to generally as hosts 22), a data storage system 24 (e.g., a storage area network), communications connections 25, and network connection 26. The hosts 22 communicate through the communication connections 25 and the network connection 26 of the data storage system 24. For example, the host 22-A provides a request for data over a communication connection 25 to the data storage system 24, which responds with the requested data (or an indication that the host 22-A does not have the right to access the data), as will be discussed in more detail for FIG. 4.

The communication connection 25 is a connection over a medium (e.g., a cable) suitable for use in communications between electronic devices such as computers and data storage devices. In one embodiment, the communication connection 25 is a cable configured according to the SCSI protocol and supporting SCSI block based data access commands. In another embodiment, the connection 25 is a cable, modem, or other connections supporting an IP protocol, such as connections suitable for use with the Internet. In one embodiment, the communication connection 25 provides for secure communications (e.g., between a host 22 and a data access manager 28). For example, the communication connection 25 is a channel over a dedicated cable that physically connects two computers and not easily accessible to unauthorized personnel who may try to monitor or tap the cable. In another example, encryption techniques, such as those known in the cryptographic arts, are used to insure a secure communication over a communication connection 25 that is based on a network connection 26 (e.g., over the Internet).

The network connection 26 is preferably a network of communication connections 25 which enables the hosts 22 and the components of the data storage system 24 to communicate with each other. In one arrangement, the communication connections 25 and the network connection 26 form a local area network. It should be understood that the network connection 26 can have different network topologies, such as a ring, hub and spoke, backbone, or other topologies suitable for use with networks of computers and electronic devices.

The host 22-A is a computing device that includes a processor 32-A (e.g., microprocessor), memory 34-A (e.g., volatile memory and nonvolatile data storage), and input/output controller 36-A. In one embodiment, each host 22-B and 22-C has a configuration similar to the configuration of host 22-A. The memory 34-A includes tokens 37 and a host application 38 (e.g., logic instructions stored on a disk). It is to be understood that when a reference is made herein to the host 22-A performing an action, this means that the processor 32-A of the host 22-A operating according to the instructions of the host application 38 is performing the action. The tokens 37 are strings of data (e.g., bit strings developed by a random number generating program) that serve as unique identifiers and/or keys. There are several different types of tokens 37, including access tokens 40, master tokens 42, and host tokens 43. The access tokens 40 are associated with address ranges in a data storage assembly to 30. A master token 42 is associated with the data access manager 28. A host token 43 is associated with each host 22. Each of the tokens, 40, 42, and 43 will be discussed in more detail later.

The data storage system 24 includes, in the example shown in FIG. 1, a data access manager 28 (e.g., network switch or router), data storage assemblies 30-A, 30-B, and 30-C (referred to generally as data storage assemblies 30), and the network connection 26. The data access manager 28 includes a processor 32-B (e.g., microprocessor) and memory 34-B (e.g., volatile memory and nonvolatile data storage such as a disk). The memory 34-B includes a data access manager application 44 (e.g., logic instructions stored on a disk), a token table 41 (discussed for FIG. 10), and the master token 42. It is to be understood that when there is a reference herein to the data access manager 28 performing an action, the reference indicates that the processor 32-B of the data access manager 28 is performing the action according to the instructions of the data access manager application 44.

The data storage assembly 30 includes a control circuit 33 and data storage 48 (e.g., one or more hard disks). The data storage 48 includes storage locations 52 (e.g., disk addresses) that include one or more sets of data 50 stored in the storage locations 52 and one or more access tokens 40. In one embodiment, each set of data 50 is associated with one access token 40. The access token 40 is one example of the tokens 37 described previously.

In one embodiment, a computer program product 180 including a computer readable medium (e.g., one or more CDROM's, diskettes, tapes, etc.) or a computer program propagated signal product 182 embodied on a propagated signal on a propagation medium (e.g., a radio wave, an infrared wave, a laser wave, sound wave, or an electrical wave propagated over the Internet or other network) provides software instructions for the host application 38 and the data access manager application 44.

In a general summary of the operation of the components of FIG. 1, each host 22 includes a host token 43 identifying that host 22 in a request sent to the data access manager 28 to authorize access to data in storage locations 52 on a data storage assembly 30. The data access manager 28 authenticates the access request based on the host token 43 received with the request. The data access manager 28 then includes a master token 42 identifying the data access manager 28 and an access token 40 associated with the storage locations 52 in a command sent by the data access manager 28 to the data storage assembly 30 to authorize the access request made by the host 22. The data storage assembly 30 authenticates the command from the data access manager 28 based on the master token 42 and associates the access token 40 with the storage locations 52, if not done so already. The data access manager 28 then returns the access token 40 to the host 22 that sent the request. That host 22 can then include the access token 40 in a data access command sent from that host 22 to the data storage assembly 30, which authenticates access to the storage locations 52 based on the access token 40. The additional FIGS. 2 through 10 describe in more detail the process described above of providing access to the storage location 52 in the data storage assembly 30, as well as the processes of generating, distributing, and changing the tokens 37 (e.g. access tokens 40, master token 42, and host tokens 43) in the computer network 20.

Figure 2:
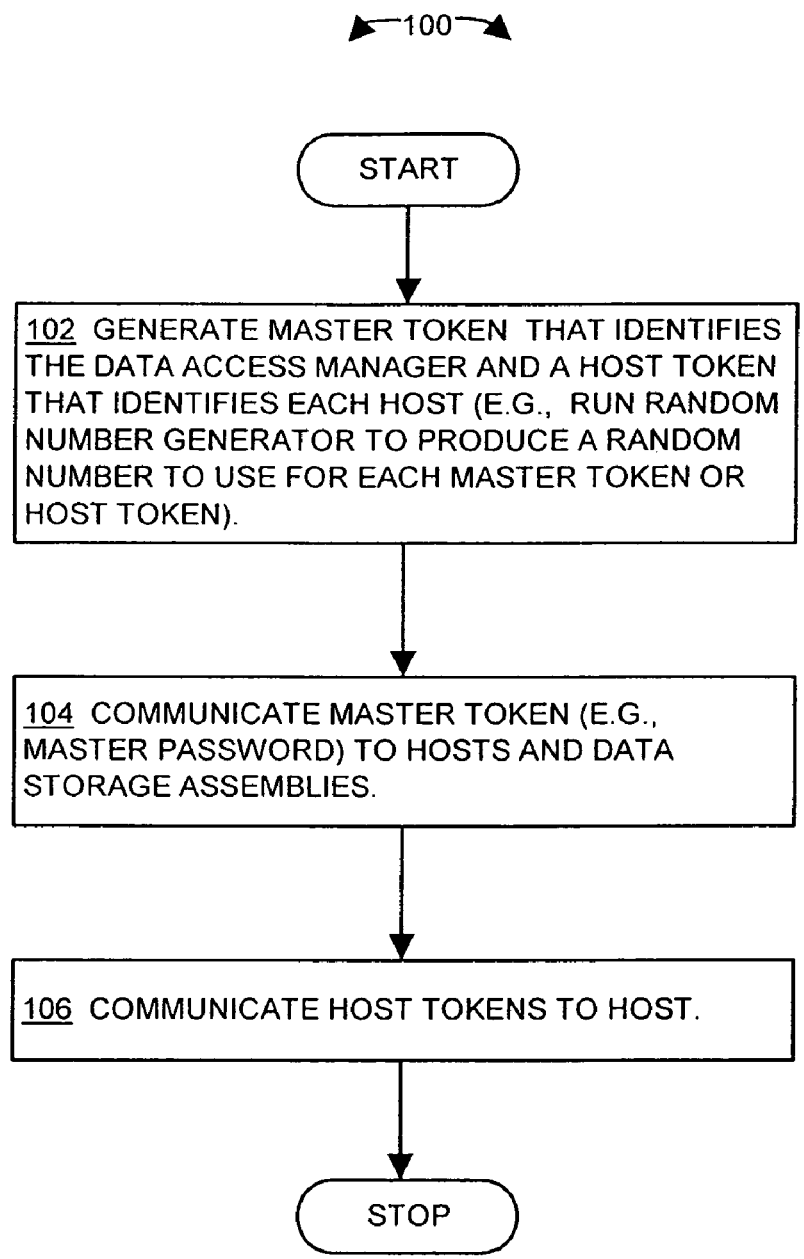
FIG. 2 shows a flow diagram of a procedure for establishing a master token performed by the data storage system illustrated in FIG. 1.

FIG. 2 shows a flow diagram of a procedure 100 for establishing a master token 42 performed by the data storage system 24 illustrated in FIG. 1. In step 102, the data access manager 28 (i.e. the processor of the data access manager 28 executing the instructions of the data access manager application 44) generates a master token 42 that identifies the data access manager 28 and a host token 43 that identifies each host 22. The master token 42 and the host token 43 are examples of the token 37 described previously. For example, the data access manager 28 executes a random number generator to produce a random number to used as a master token 42, and other random numbers to be used as host tokens 43. The data access manager 28 is not required to use a random number generator, but can use other programs or mechanisms to generate a unique data string (e.g., string of bits) used for identification and authentication. Thus the master token 42 serves to identify and authenticate a particular data access manager 28, and a host token 43 serves to identify and authenticate a particular host 22. For example, the master token 42 functions as a master password that allows the data access manager 28 to change tokens 37 (e.g., host tokens 43 and access tokens 40) that the data access manager 28 previously communicated to hosts 22 and data storage assemblies 30.

In step 104, the data access manager 28 communicates the master token 42 to the hosts 22 and data storage assemblies 30. The data access manager 28 can communicate the initial or first instance of a master token 42 (e.g., when first setting up a data storage system 24 including a data access manager 28) with additional security safeguards, such as an encrypted approach, using a public/private key approach or other highly secure approach as is known in the cryptographic arts. In an alternate embodiment, the initial communication of a master token 42 involves manual intervention, such as by a system or network administrator using a password to insure secure communication of the first master token 42 (e.g., to the data storage system 24).

In step 106, the data access manager 28 communicates the host tokens 43 to the hosts 22. In one approach, a host 22 contacts the data access manager 28 when the host 22 boots up (e.g., through a Data Host Initialized command), and the data access manager 28 provides a host token 43 for that host 22. For example, the host 22 provides a host name with the Data Host Initialized command request (e.g., a block based command suitable for use with the SCSI protocol), and the data access manager 28 checks to determine that the received host name is a valid one (e.g., compares the received host name to a list of host names entered by a network administrator). If the data access manager 28 determines that the received host name is valid, the data access manager 28 then returns a host token 43 to the host 22 that provided the Data Host Initialization command. As described herein, the block based commands referred to herein, such as the Data Host Initialized command can be commands suitable for use with SCSI block based commands and represent an extension of the SCSI command protocol as one implementation of the invention.

When replying to such a contact from a host 22, the data access manager 28 may also provide a master token 42 identifying the data access manager 28, which the host 22 stores in its memory (e.g., host memory 34-A) so that the host 22 can authenticate a future communication (e.g., command) from the data access manager 28, which includes the master token 42. For example, the host 22-A can compare the master token 42 that is stored in the host memory 34-A to authenticate the communication from the data access manager 28 by determining if the stored master token 42 is the same as the master token 42 provided in the communication from the data access manager 28. After authenticating the communication, the host 22-A then responds to the communication from the data access manager 28.

Figure 3:
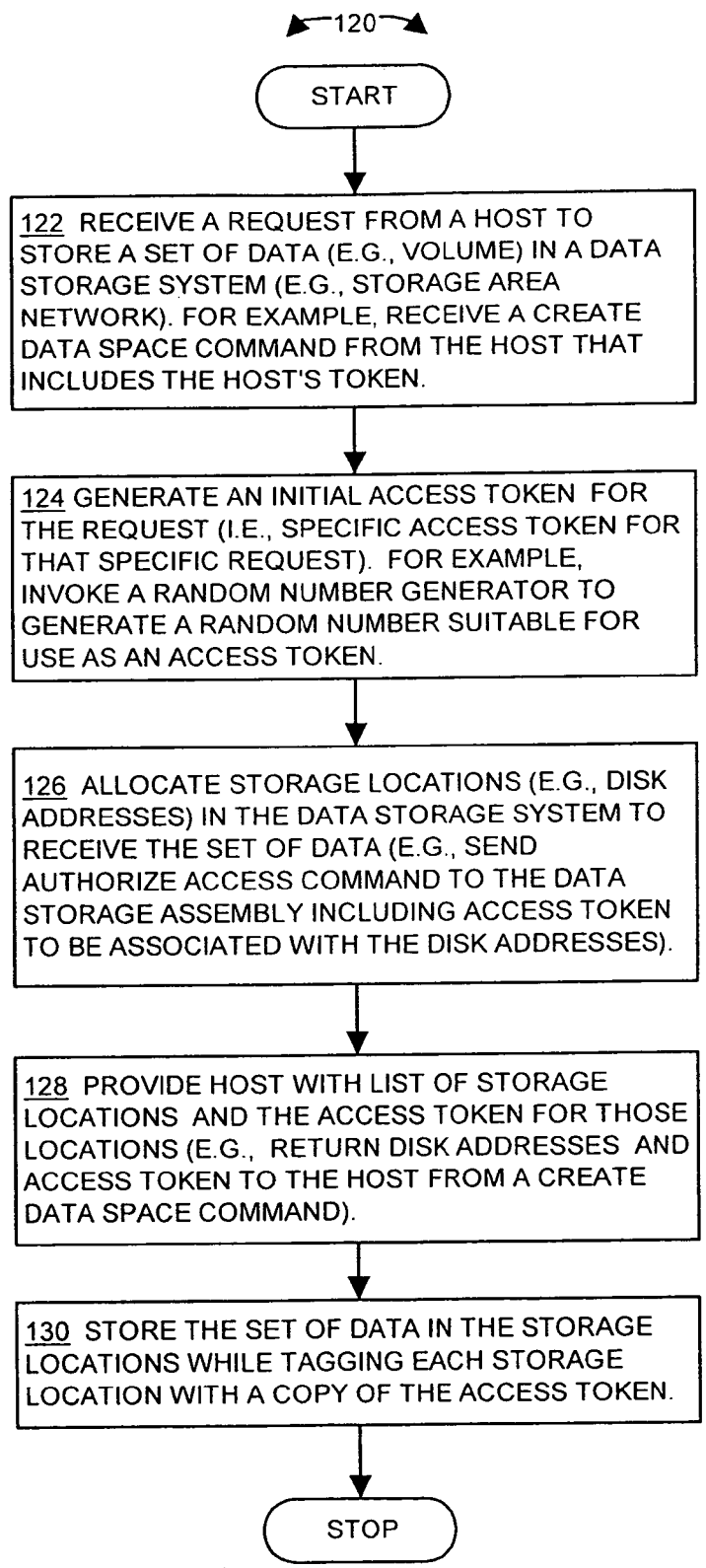
FIG. 3 shows a flow diagram of a procedure for storing data performed by the data storage system illustrated in FIG. 1.

FIG. 3 shows a flow diagram of a procedure 120 performed by the data access manager 28 of the data storage system 24 for storing data (e.g., set of data 50) in the data storage system 24 at the request of a host 22. In step 122, the data access manager 28 (e.g., network switch or router) receives a request from a host 22 to store a set of data 50 (e.g., a volume) in a data storage system 24 (e.g., storage area network). For example, the host 22 sends a Create Data Space request (e.g., a block based command suitable for use with the SCSI protocol) to the data access manager 28. In this example, the Create Data Space request includes the host token 43 that the data access manager 28 can use to authenticate the request by comparing the received host token 43 in the Create Data Space request to a stored host token 43 that the data access manager 28 has stored in its memory 34-B.

In step 124, after the data access manager 28 receives and authenticates the request to store data from the host 22, the data access manager 28 generates an initial access token 40 for the request (i.e., a specific access token 40 for that specific request). For example, the data access manager 28 invokes a random number generator to generate a random number suitable for use as an access token 40. Because one data access manager 28 may generate a large number of access tokens 40, the data access manager 28 must insure that there are no duplicate access tokens 40. In one embodiment, the data access manager 28 can use techniques known in the cryptographic arts to insure that each access token 40 is highly unlikely to be a duplicate of any other access token 40 generated by any other data access manager 28 (e.g., by generating a very large random number for each access token 40).

In step 126, the data access manager 28 allocates storage locations 52 in the data storage system 24 (e.g., on one or more disks) to receive the set of data 50. For example, the data access manager 28 determines from the Create Data Space command the amount of data storage space that the host 22 is requesting, and determines one or more ranges of disk addresses in one or more disks in one or more data storage assemblies 30 that will accommodate the amount of data storage space that the host 22 requested. Then the data access manager 28 sends an Authorize Access command (e.g., a block based command suitable for use with the SCSI protocol) to a data storage assembly 30 specifying the ranges of disk addresses and the access token 40 that the data storage assembly 30 is to associate with those disk addresses.

In step 128, the data access manager 28 provides the host 22 with a list of the storage locations 52 and the access token 40 associated with those storage locations 52. For example, the data access manager 28 returns a list of disk address ranges and an access token 40 in response to the Create Data Space command received from the host 22 in step 122.

Figure 9:
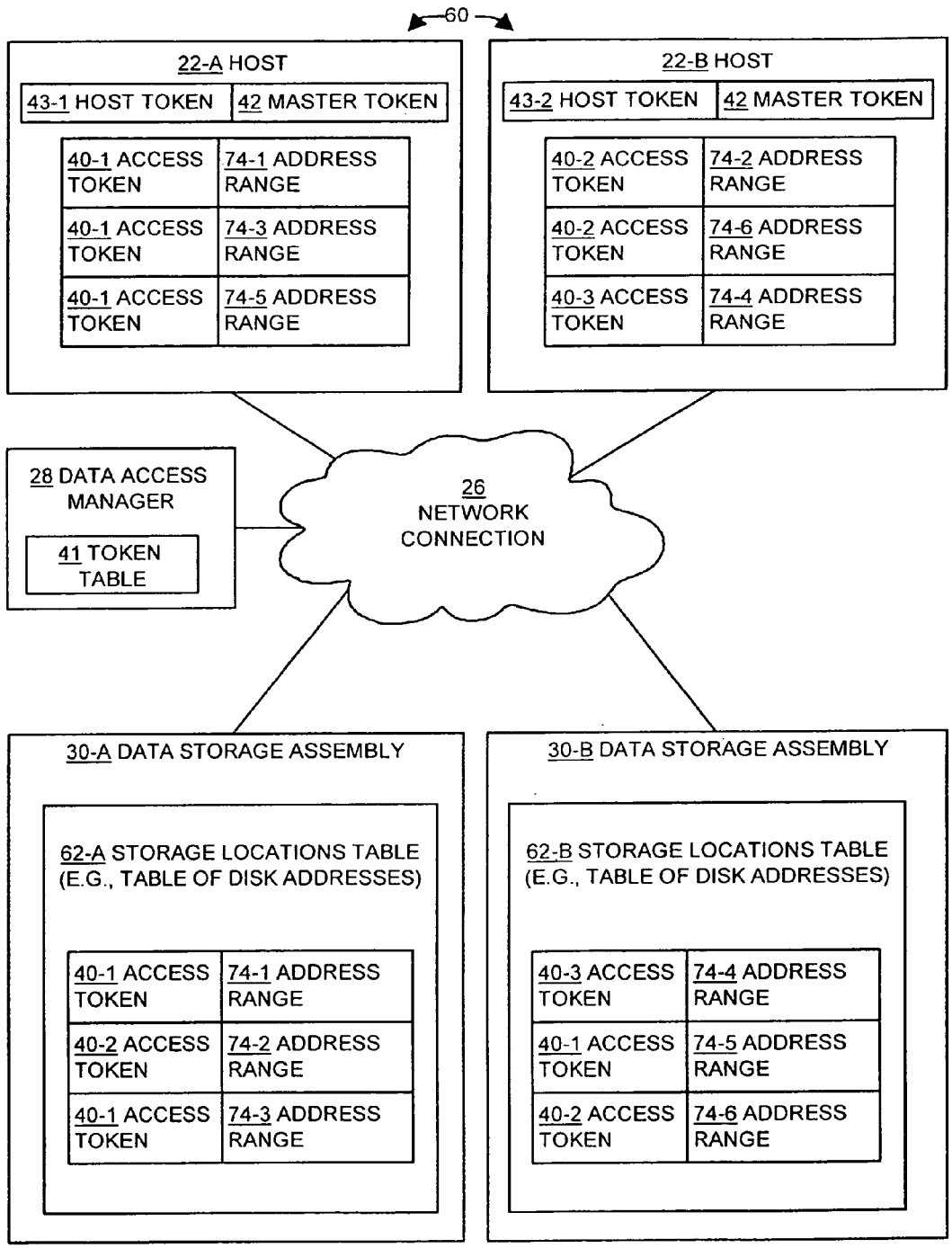
FIG. 9 shows a block diagram of a data access system with token-related data configured in accordance with the invention.

In step 130, the data access manager 28 then directs the data storage assembly 30 to store the set of data 50 specified by the host 22 in the allocated data storage locations 52. The data storage assembly 30 tags each storage location 52 (e.g., range of disk addresses) with the access token 40 provided by the data access manager 28 (e.g., in the Authorize Access command). In one embodiment, the data storage assembly 30 stores a copy of the access token 40 with each storage location 52. In another embodiment, the data storage assembly 30 does not store a copy of the access token 40 with each storage location 52, but maintains a table (e.g., a storage location table 62, as shown in FIG. 9) that lists storage locations 52 and their associated access tokens 40.

Figure 4:
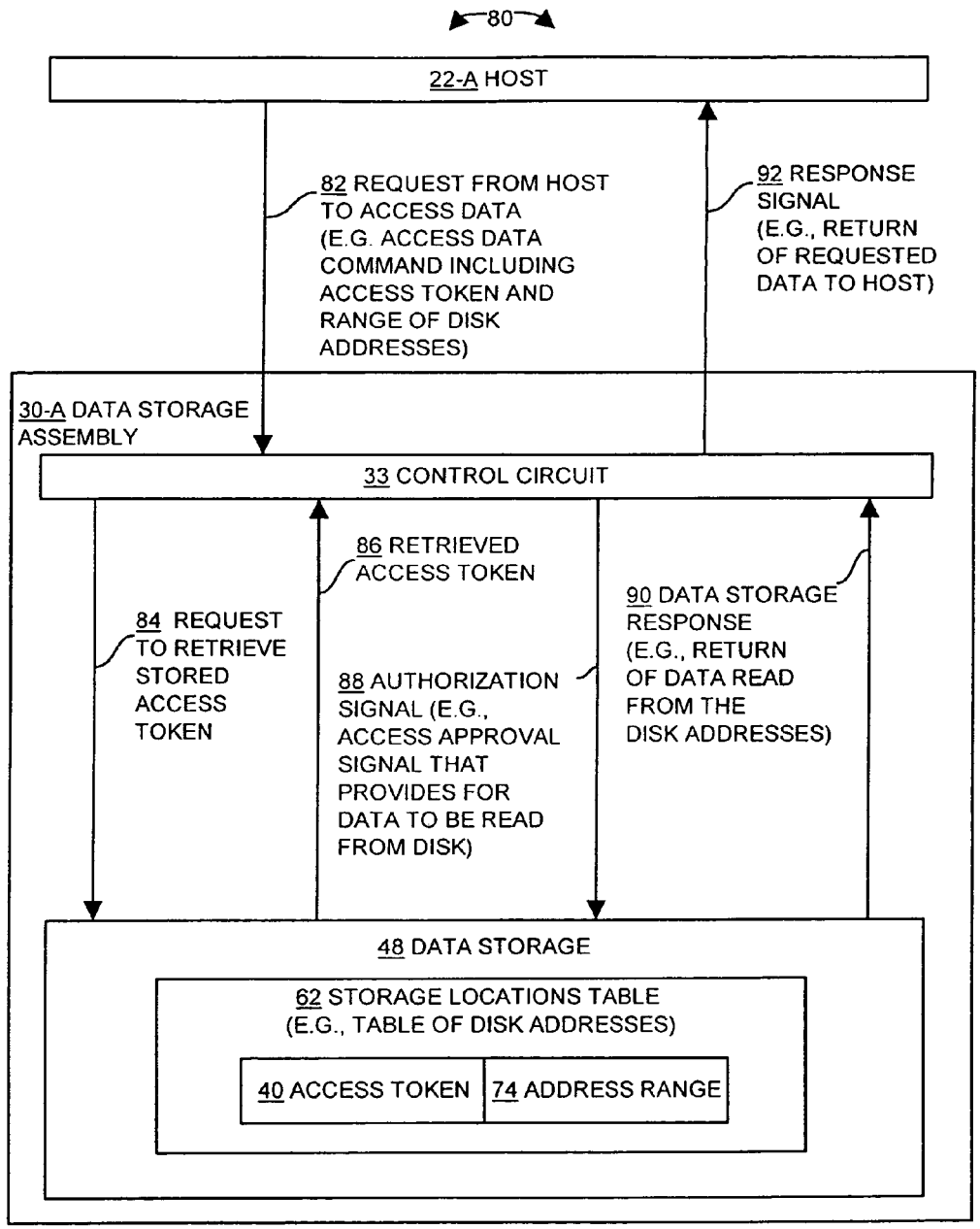
FIG. 4 shows a block diagram of a host and data storage assembly configured in accordance with the invention.

FIG. 4 shows a block diagram of a system 80 showing a host 22-A and data storage assembly 30-A configured in accordance with the invention. The data storage 48 in the data storage assembly 30-A shows a storage locations table 62 including an access token 40 and address range 74 (e.g., one or more ranges of disk addresses). The storage locations table 62 is discussed in more detail for FIG. 9. FIG. 4 illustrates examples of signals 82 through 92 which represent commands, message, and/or electronic signals that provide for communications between the host 22-A and the control circuit 33 of the data storage assembly 30-A and between the control circuit 33 and the data storage 48 of the data storage assembly 30-A.

Host request signal 82 is a request from the host 22-A to the control circuit 33 to access data (e.g., read or write data). The request from the host 22-A can be to access all of the data in a set of data 50 or to access a portion of the set of data 50 (e.g., data in a range of disk addresses that is less than the full range of disk addresses that would encompass the entire set of data 50). For example, the host 22-A sends an Access Data command (e.g., a block based command suitable for use with the SCSI protocol) to the control circuit 33.

Retrieval request 84 is a request from the control circuit 33 to retrieve a stored access token 40 from data storage 48 that is associated with the disk addresses 74 indicated by the host request signal 82. The retrieved access token signal 86 is a signal returned from data storage 48 to the control circuit 33 that includes the access token 40 requested in the retrieval request 84. The authorization signal 88 is a signal providing or denying authority to access the set of data 50. For example, the authorization signal is an access approval signal providing authority and instructions to read data from disk addresses 74 or an access failure signal providing an error message to be stored in an error log in data storage 48.

Figure 6:
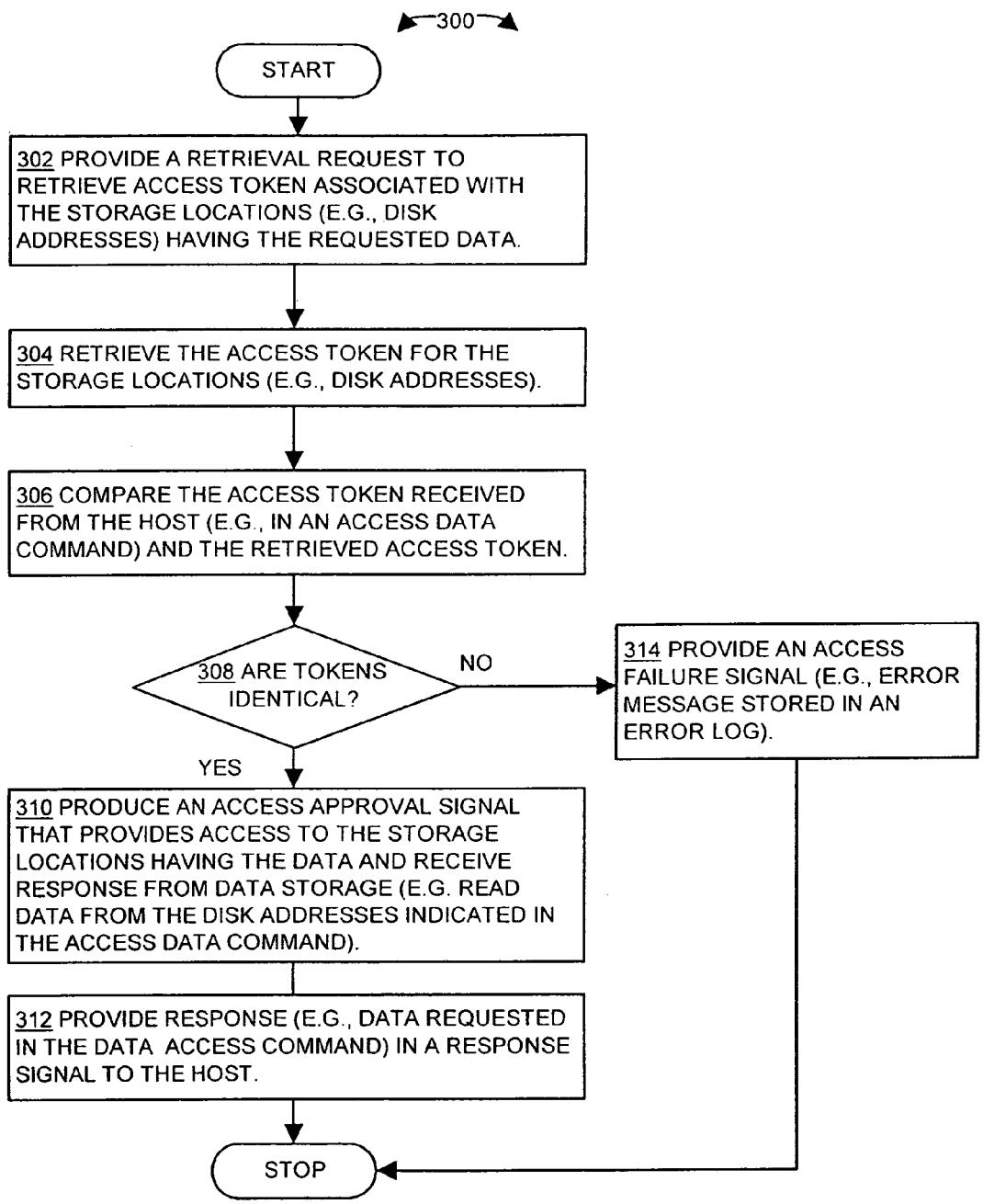
FIG. 6 shows a flow diagram of a procedure for authorizing access to data performed by the data storage assembly illustrated in FIG. 4.
Figure 7:
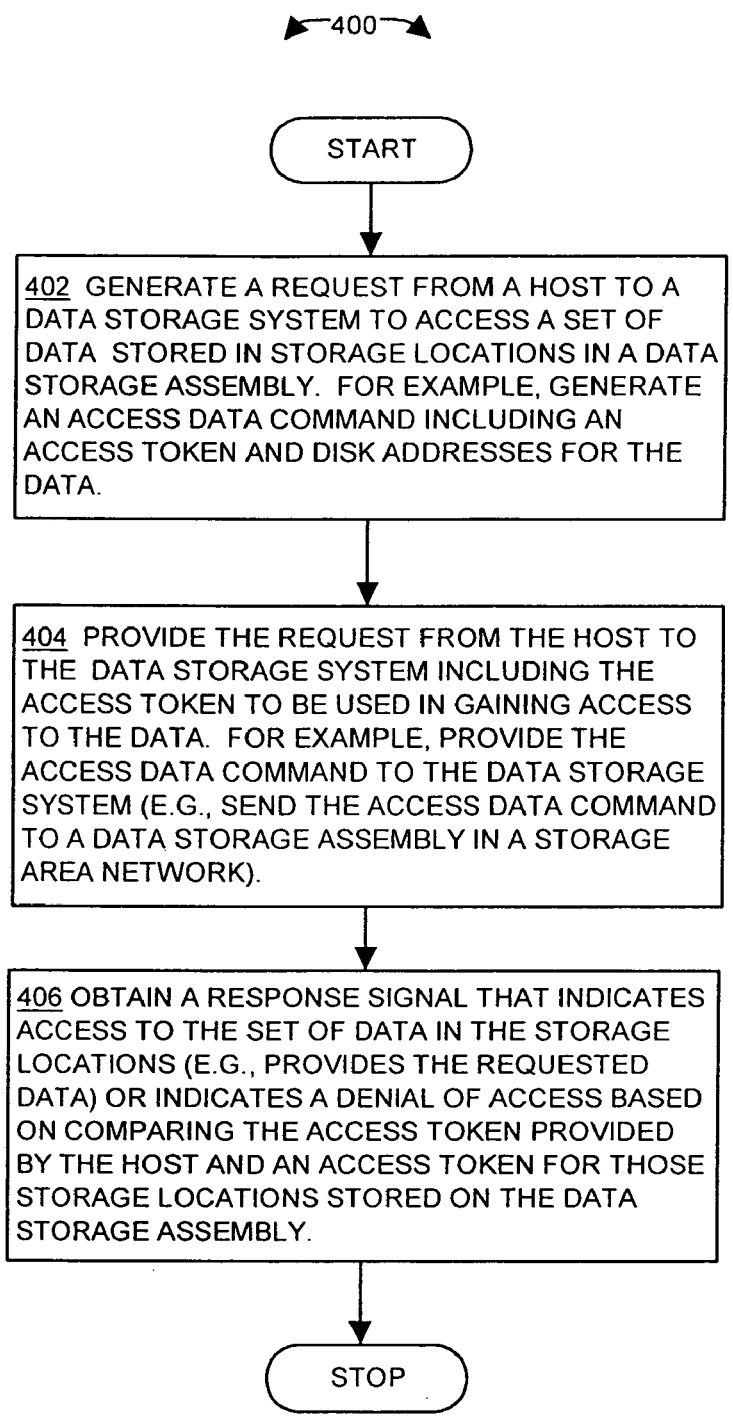
FIG. 7 shows a flow diagram of a procedure for requesting access to data performed by the host illustrated in FIG. 4.

The data storage response signal 90 is a response from the data storage 48 to the control circuit 33 to the authorization signal 88. For example, the data storage response signal 90 is a return of the data authorized to be read by the authorization signal 88. The response signal 92 is a response from the control circuit 33 to the host 22-A that provides a response to the host request signal 82. For example, the response signal 92 is a return of the data requested by the host 22-A in the host request signal 82. The following discussions on FIGS. 5 through 7 provide more details on the process of generating, receiving and responding to a request from a host 22-A.

Figure 5:
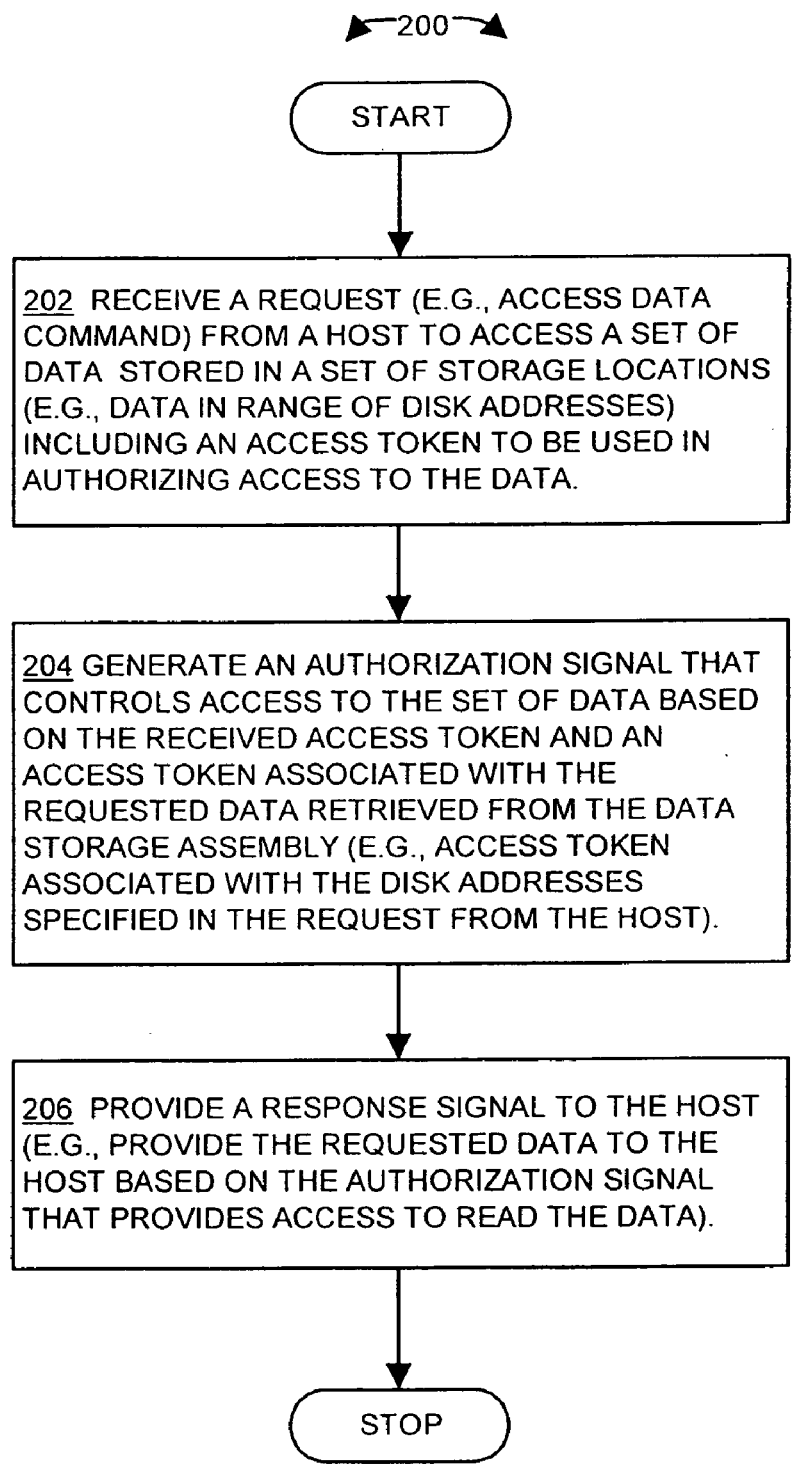
FIG. 5 shows a flow diagram of a procedure for providing access to data performed by the data storage assembly illustrated in FIG. 4.

FIG. 5 shows a flow diagram of a procedure 200 for providing access to data (e.g., a set of data 50 stored in storage locations 52) performed by the data storage assembly 30-A illustrated in FIG. 4. In step 202, the control circuit 33 of the data storage assembly 30-A receives a host request signal 82 (e.g., Access Data command) from a host 22-A to access a set of data 50 (or portion of the set of data 50) stored in a set of storage locations 52 (e.g., data in one or more ranges of disk addresses) in the data storage 48 of the data storage assembly 30-A. The host request signal 82 includes an access token 40 previously associated with the storage locations 52, as discussed for FIG. 3.

In step 204, the control circuit 33 generates an authorization signal 88 that controls access to the set of data 50. The control circuit 33 sends a retrieval request signal 84 to the data storage 48 to retrieve the access token 40 associated with the storage locations 52 indicated in the host request signal 82. The control circuit 33 bases the authorization signal 88 on a comparison of the access token 40 received in the host request signal 82 and the retrieved access token 40 associated with the storage locations 52, as will be discussed in more detail for FIG. 6.

In step 206, the control circuit 33 provides a response signal 92 to the host 22-A. For example, the control circuit 33 receives data read from the storage locations 52 in the data storage response signal 90 from data storage 48, and then provides this data in the response signal 92 to the host 22-A with the result that the host 22-A receives the set of data 50 (or portion of the set of data 50) requested in the host request signal 82.

FIG. 6 shows a flow diagram of a procedure 300 for authorizing access to data (e.g., set of data 50 or portion of a set of data 50) performed by the data storage assembly 30-A illustrated in FIG. 4. In step 302, the control circuit 33 provides a retrieval request signal 84 to retrieve an access token 40 associated with the storage locations 50 (e.g., range of disk addresses 74) having the data requested by the host 22-A in the host request signal 82 (e.g., Access Data command).

In step 304, the control circuit 33 retrieves the access token 40 associated with the storage locations 52 indicated in the request from the host 22-A. For example, the control circuit 33 receives a retrieved access token signal 86 from data storage 48.

In step 306, the control circuit 33 compares the access token 40 received from the host 22-A (e.g., in host request signal 82 having an Access Data command) to the access token 40 obtained in the retrieved access token signal 86. In step 308, the control circuit 33 determines if the two access tokens 40 compared in step 306 are identical. In another embodiment, the control circuit determines if the two access tokens 40 are substantially identical (e.g., if two numbers representing the two tokens 40 are sufficiently close to be considered a valid match, based on a predetermined limit or tolerance).

If the access tokens 40 are not identical, in step 314, the control circuit 33 provides an access failure signal (e.g., an error message sent to data storage 48 in an authorization signal 88 to be stored in an error log). In one embodiment, the control circuit 33 also provides a response signal 92 to the host 22-A indicating that the control circuit 33 is not allowing access to the storage locations 52 requested in the host request signal 82.

If the access tokens 40 are identical, in step 310, the control circuit 33 produces an access approval signal (e.g., as an authorization signal 88) that provides access to the storage locations 52 having the data requested in the host request signal 82. The control circuit 33 then receives a response from data storage 48 in a data storage response signal 90. For example, the control circuit 33 receives the data from data storage 48 read from the range of disk addresses indicated by the host 22-A in an Access Data command.

In step 312, the control circuit provides a response signal 92 to the host 22-A. For example, the control circuit 33 provides the data requested by the host 22-A in the Access Data command or indicates that the data is not being provided (i.e., the request was not authenticated by the comparison performed in steps 306 and 308).

FIG. 7 shows a flow diagram of a procedure 400 performed by the host 22-A for requesting access to data. In step 402, the host 22-A generates a request to access data in a host request signal 82 to be sent from the host 22-A to the data storage assembly 30-A. For example, the host 22-A generates an Access Data command including a range of disk addresses 74 having the data and an access token 40 associated with those disk addresses 74. For example, the host 22 can provide instructions for a credit card transaction application such that the host 22 authorizes and processes credit card transactions, such as those initiated by an individual purchasing a product by credit card in a store. In this example, the host 22 makes a request to the data storage system 24 to access the credit card account data stored in the data storage system 24 for the individual making the purchase.

In step 404, the host 22-A provides the host request signal 82 from the host 22-A to the data storage assembly 30-A, including the access token 40 associated with the storage locations 52 having the data. For example, the host 22-A provides the Access Data command to the control circuit 33 of the data storage assembly 30.

In step 406, the host 22-A obtains a response signal 92 from the data storage assembly 30-A. For example, the response signal 92 provides data that was previously requested in the Access Data command sent from the host 22-A to the data storage assembly 30-A. Alternatively, the response signal 92 provides an indication that the data is not being provided because the control circuit 33 could not approve access to the storage locations 52 storing the requested data.

Figure 8:
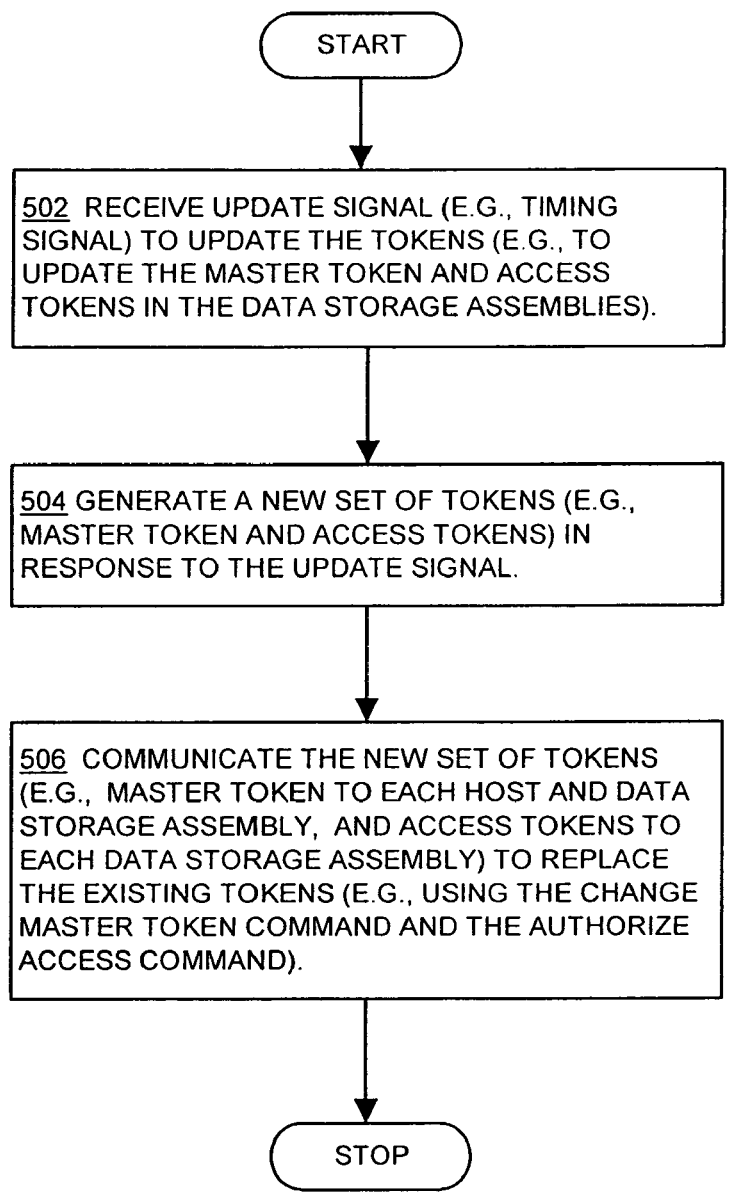
FIG. 8 shows a flow diagram of a procedure for changing tokens performed by the data access manager illustrated in FIG. 1.

FIG. 8 shows a flow diagram of a procedure 500 for changing tokens 37 performed by the data access manager 28 illustrated in FIG. 1. In step 502, the data access manager 28 receives an update signal (e.g., a timing signal) to update one or more of the tokens 37 (e.g., one or more access tokens 40, the master token 42, and/or one or more host tokens 43). The update signal can be a timing signal generated by a timing circuit in the data access manager 28 (e.g., update the master token 42 every 24 hours). The update signal can also be a signal received by the data access manager 28 from a computer network or device over a connection 25. For example, the data storage assembly 30 indicates to the data access manager 28 that it is receiving repeated unauthorized attempts to access data by a host 22 (e.g., the host 22 does not provide valid access tokens 40 in Access Data commands that the host 22 is sending to the data storage assembly 30), and the data access manager 28 decides to update the access tokens 40 to prevent the unauthorized host 22 from gaining access to data (e.g., by making unlimited attempts to guess the access token 40).

In step 504, the data access manager 28 generates new tokens 37 in response to the update signal received in step 502. For example, the data access manager 28 generates a new master token 42 and new access tokens 40.

In step 506, the data access manager 28 communicates the new tokens 37 to the host 22 and/or data storage assembly 30. For example, if the master token 42 is changing the data access manager 28 sends a Change Master Token command (e.g., a block based command suitable for use with the SCSI protocol) that includes the current master token 42 as well as the new master token 42 to the hosts 22 and data storage assemblies 30 that the data access manager 28 communicates with. The device (e.g., host 22 or data storage assembly 30) receiving the Change Master Token command authenticates the command if the current master token 42 in the command is identical (or substantially identical) to the master token 42 stored in the device.

In another example, if an access token 40 is changing, the data access manager 28 sends an Authorize Access command to a data storage assembly 30 providing the new access token 40 and the storage locations 52 associated with the new access token 40. The data storage assembly 30 then replaces any current access token 40 associated with those storage locations 52 with the new access token 40 provided in the Authorize Access command.

FIG. 9 shows a block diagram of a data access system 60 with token-related data configured in accordance with the invention. The data access system 60 includes host 22-A and 22-B, data access manager 28, and data storage assemblies 30-A and 30-B, all connected by the network connection 26. The data access manager 28 includes a token table 41, which is discussed in more detail for FIG. 10.

Host 22-A includes a host token 43-1 that identifies host 22-A, and host 22-B include a host token 43-2 that identifies host 22-B. In one embodiment, each host 22-A or 22-B receives the host token 43-1 or 43-2 from the data access manager 28 when the host 22-A or 22-B boots up. For example, when host 22-A boots up, the host 22-A announces its presence to the data access manager 28 via the network connection 26 (e.g., LAN or SAN) by using a Data Host Initialized command that includes the name of the host 22 (e.g., a host identifier 76, as discussed for FIG. 10). The data access manager 28 verifies that the host name is a valid name of a host 22 that is allowed to have access to the data storage assemblies 30 controlled by the data access manager 28. If the host name is a valid name, the data access manager 28 returns a host token 43-1 to the host 22-A in response to the Data Host Initialized command. At a later point in time, if the host 22-A has a set of data 50 to store on a data storage assembly 30, the host 22-A provides a Create Data Space command that includes the host token 43-1. The data access manager 28 uses the host token 43-1 to verify that the Create Data Space command is from a valid host 22-A. In one embodiment, the data access manager 28 compares the host token 43-1 received in the Create Data Space command with a host token 43-1 stored on the data access manager 28 for that host 22-A (e.g., identified by a host identifier 76-A, as discussed for FIG. 10). The host 22-A then issues an Authorize Access command to the data storage assembly 30 that includes the address range 74 (e.g., one or more disk address ranges) of the data to be stored and a specific access token 40 to be used in accessing that address range 74. After the data storage assembly 30-A allocates the address range 74, as discussed for FIG. 3, then the data access manager 28 returns the access token 40 to the host 22-A.

Alternatively, if the host 22-A needs to access existing data stored on the data storage assemblies 30, the host 22-A provides an Access Data Authorization command (e.g., a block based command suitable for use with the SCSI protocol) that includes the host token 43-1 and the range of addresses 74 that the host 22-A seeks to access (e.g., a block of data in a set of data 50 that has been previously stored in a set of storage locations 52). The data access manager 28 uses the host token 43-1 to verify that the Access Data Authorization command is from a valid host 22-A, as described above for the Create Data Space command. The host 22-A then issues an Authorize Access command to the data storage assembly 30-A that includes the address range 74 of the data to be accessed and a specific access token 40 to be used in accessing that address range 74.

Host 22-A also includes an access token 40-1 associated with address ranges 74-1, 74-3, and 74-5 (e.g., returned previously to the host 22-A by the data access manager 28 after the host 22-A issued a Create Data Space command to the data access manager 28). Host 22-B includes an access token 40-2 associated with address ranges 74-2 and 74-6, and an access token 40-3 associated with address range 74-4.

The address ranges 74-1, 74-3, and 74-5 identify address ranges 74 recorded in the storage locations tables 62-A and 62-B on the data storage assemblies 30-A and 30-B. The address ranges 74 associated with the access token 40 can be located on different data storage assemblies 30. For example, as shown in FIG. 9, the address ranges 74-1 and 74-3 (associated with access token 40-1) are located on storage assembly 30-A, and the address range 74-5 (also associated with access token 40-1) is located on storage assembly 30-B. In addition, the address range 74-2 (associated with access token 40-2) is located on data storage assembly 30-A, and the address range 74-6 (also associated with access token 40-2) is located on data storage assembly 30-B. Thus the data access manager 28 can allocate address ranges 74 on data storage assemblies 30 (or on different disks in the same data storage assembly 30) without any requirement by the invention that an access token 40 correspond to any particular address range 74 or data storage assembly 30. In other words, the data access manager 28 is free to allocate disk addresses (e.g., in response to a Create Data Space command) using the criteria that it would typically use for allocating disk space. For example the data access manager 28 allocates disk space based on which data storage assembly 30 has disk space available, or takes advantage of available space on several disks (e.g., in one data storage assembly 30) or on several data storage assemblies 30 if needed.

FIG. 10 shows a block diagram of a token table 41 in a data access manager 28 configured in accordance with the invention. The token table 41 indicates the address ranges 74 and access tokens 40 associated with each data storage assembly 30 (e.g., the access token 40 that was assigned to one or more address ranges 74 as the result of a Create Data Space command sent to the data access manager 28 from a host 22 making a request to store a set of data 50 on a data storage assembly 30). For example, as shown in FIG. 10, the sample token table 41 shows data storage assembly identifier 72-A (e.g., an identifier for data storage assembly 30-A) and address ranges 74 (e.g., disk address ranges) for stored data on the data storage assembly indicated by the identifier 72-B. The token table 41 associates address ranges 74-1 and 74-3 with access token 40-1, and address range 74-2 with access token 40-2. The sample token table 41 also shows data storage identifier 72-B (e.g., an identifier for data storage assembly 30-B) and address ranges 74 (e.g., disk address ranges) for stored data on the data storage assembly indicated by the identifier 72-B. The token table 41 associates address ranges 74-4 with access token 40-3, address range 74-5 with access token 40-1, and address range 74-6 with access token 40-2. Thus, if the data access manager 28 assigns a specific access token 40 to an address range 74 as the result of an Create Data Space command sent to the data access manager 28 from a host 22, then the data access manager 28 maintains a record of the access token 40 assigned to that address range. For example, if the data access manager 28 allocates an address range 74-1 in data storage assembly 30-A as the result of the host's 22-A Create Data Space command, then the data access manager 28 assigns an access token 40-1 for that address range 74-1. Then, in one embodiment, if the host-A 22 sends an Access Data Authorization request to the data access manager 28 to access the same address range 74-1, the data access manager 28 can then provide the access token 40-1 as recorded in the token table 41 in the data access manager 28. In another embodiment, the data access manager 28 assigns a new access token 40 for the Access Data Authorization to be used with the specific access that the host 22-A is requesting, and the data access manager 28 associates this new access token 40 in the token table 41 with address range 74-1. In a further embodiments, the data access manager 28 associates other tokens 37, such as a host token 43 with each address range 74 in the token table 41.

The token table 41 also includes host identifiers 76 (e.g., 76-A and 76-B) and host tokens (e.g., 43-1, 43-2). The data access manager 28 associates host identifier 76-A with host token 43-1, and host identifier 76-B with host token 43-2. For example, if a host 22-A contacts the data access manager 28 when the host 22-A boots up with a Data Host Initialized command, then the data access manager 28 returns a host token 43-1 for that host 22-A and stores the host token 43-1 in the token table 41 along with the host identifier 76-A that identifies the host 22-A. When the host 22-A contacts the data access manager 28 with an Access Data Authorization command or Create Data Space command, the host 22-A includes the host token 43-1, and the data access manager 28 can authenticate the command by comparing the host token 43-1 received from the host 22-A to the host token 43-1 for that host 22-A stored in the token table 41 of the data access manager 28.

As described previously, the invention is directed to techniques for providing security for data in data storage systems 30 accessed by other systems, such as hosts 22. In particular, a data storage system 30 (e.g., storage area network or SAN) provides for authentication of device-oriented, data block based commands (e.g., SCSI commands) that can be transmitted over communication connections 25 (e.g., the Internet). Such an approach provides for tokens 37 to be associated with specific addresses 74 (e.g., range of disk addresses) on one or more data storage assemblies 30. For example, a data access manager 28 (e.g., network switch) associates specific access tokens 40 with disk address ranges 74 for data in a data storage assembly 30, and provides the access token 40 to a host 22. The host 22 then provides the access token 40 to the data storage assembly 30 when requesting access to the data in those disk address ranges 74. Thus, the data storage assembly 30 is able to prevent an unauthorized access by a host 22 trying to access data if that host 22 does not provide the access token 40 associated with the disk addresses 74 for that data. Other tokens 37 provide authentication for electronic devices, such as the master token 42 used to identify and authenticate the data access manager 28 and host tokens 43 used to identify and authenticate hosts 22.

While this invention has been particularly shown and described with references to preferred embodiments thereof, it will be understood by those skilled in the art that various changes in form and details may be made therein without departing from the spirit and scope of the invention as defined by the appended claims.

For example, the invention is suited for use over different types of connections 25 that form the network connection 26 in the data storage system 24 (e.g., storage area network). The connections 25 may use any suitable medium for communications among computers and/or electronic devices, including electrical, optical, wireless, or other mediums.

In another example, the techniques of the invention may be combined with security techniques to enhance the security level provided in the data storage system 24 (e.g., SAN). For example, the data access manager 28 can be located behind a firewall and/or be physically secure (e.g., in a secure building with controlled access). In general, cryptographic techniques can be used in all or any part of the system of the invention to enhance the security level.

In addition, the data storage system 24 can be configured as one device (e.g., a data access manager 28 and data storage assembly 30 combined in one computer or network electronic device) or as a storage area network, as illustrated in FIG. 1. Also, different components of the invention can be located in different physical locations or across network connections 26. For example, the data access manager 28 may be located in a different city than the data storage assemblies 30. Furthermore, different components may be implemented in different manners (e.g., hardware or software, or combination of both). For example, the control circuit 33 can be implemented as a software logic instructions executing on a processor of a computer system, as IC (integrated circuit) chips on one or more printed-circuit boards, or as one IC.

Furthermore, the types of tokens 37 can be different from the types described herein. For example, the host token 43 can serve the function of the access token 40. To enhance security, authentication may require a combination of tokens 37. For example, a data storage assembly 30 can not authenticate a data access request unless receiving a valid host token 43 from the host 22 providing the data access request, a valid specific access token 40 for the transaction, and a valid master token 42. In an additional example, the data storage assembly 30 can be required to associate two (or more) access tokens 40 with an address range 74, originating from two (or more) data access managers 28 to insure a higher level of security.

In an additional example, the propagated signal used by the computer program propagated signal product 182 is an analog carrier wave or a digital signal carried on the propagated medium. For example, the propagated signal can be a digitized signal propagated over the Internet or other network. Furthermore, the propagated signal can be a signal that is transmitted over the propagation medium over a period of time, such as the instructions for a software application sent in packets over a network over a period of seconds, minutes, or longer. In addition, the computer readable medium of the computer program product 180 can be based on a propagation medium that the computer can receive and read, such as by receiving the propagation medium and identifying a propagated signal embodied in the propagation medium, as described previously for the computer program propagated signal product 182.

In addition, the data access manager 28 can be configured in a different manner than discussed previously. For example, the data access manager 28 can be implemented in hardware, such as analog circuitry or as digital circuitry based on an IC approach. In another example, the data access manager 28 can be implemented as a combination of hardware (e.g., analog circuitry and/or digital circuitry) and software (e.g., logic instructions that execute on a digital microprocessor).

Furthermore, each host 22 can be configured in a different manner than the sample host 22-A discussed previously. For example, a host 22 can be implemented in hardware, such as analog circuitry or as digital circuitry based on an IC approach. In another example, each host 22 can be implemented as a combination of hardware (e.g., analog circuitry and/or digital circuitry) and software (e.g., logic instructions that execute on a digital microprocessor). In general, a host 22 can be any entity (i.e., processor or circuitry) that can issue a request to access data, such as a computer, electronic device, communications device, network device, network appliance, or other device.

Furthermore, the procedures (e.g., procedure 300) described herein for determining whether access tokens 40 are identical are by way of example only. Other procedures can be used by the invention to determine whether access tokens 40 comply with each other, even if the access tokens 40 are not identical. For example, a procedure can determine that access tokens 40 comply with each other if the access tokens 40 are numbers that are, in some sense, close to each other in value (e.g., both within a range of numbers). In another example, access tokens 40 comply if both are from the same group of values (e.g., a predefined group of random numbers).

What is claimed is:

1. A data storage system for accessing a set of data, comprising:
   a data access manager for establishing a plurality of tokens for accessing the set of data;
   a network connection in communication with the data access manager; and
   a data storage assembly in communication with the network connection, the data storage assembly comprising
   (i) a set of storage locations that stores the set of data, and (ii) a control circuit configured to:
      receive from a host in communication with the data access manager over the network connection (i) a device oriented, block based command to access the set of data and (ii) a first access token of the plurality of tokens that provides access to the set of data stored in the set of storage locations in the data storage system;

generate an authorization signal that controls access to the set of data based on the first access token and a second access token of the plurality of tokens, the second access token associated with the set of storage locations, by performing a comparison of the first access token to the second access token associated with the set of storage locations, if the comparison indicates that the first access token and the second access token are identical, produce an access approval signal that provides access to the set of storage locations; and if the comparison indicates that the first access token and the second access token are not identical, produce an access failure signal that indicates a denial of access to the set of storage locations; and produce a response signal that provides a response to the device oriented, block based command over the network connection to the host based on the authorization signal.

wherein, when receiving, the control circuit is configured to receive from the host in communication with the data access manager over the network connection the first access token of the plurality of tokens that provides access to the set of data stored within a range of disk addresses in the set of storage locations of the data storage assembly, the range of disk addresses distinct from file names associated with the set of data; and when generating, generate an authorization signal that controls access to the set of data based on the first access token and a second access token of the plurality of tokens, the second access token associated with the range of disk addresses in the set of storage locations.

2. The data storage system of claim 1, wherein the data access manager comprises a processor and a memory that stores a data access manager application, wherein the processor operates in accordance with instructions of the data access manager application stored in the memory to establish the plurality of tokens for accessing the set of data, and wherein the instructions of the data access manager application configure the processor to:

associate, prior to receiving the first access token, the second access token with the set of storage locations in response to an initial device oriented, block based command from the host to store the set of data;

allocate the set of storage locations in the data storage assembly to receive the set of data in response to the device oriented, block based command to store the set of data, while tagging each storage location with the second access token; and provide to the host the set of storage locations and the first access token based on the second access token.

3. The data storage system of claim 2, wherein the data access manager application comprises further instructions that configure the processor to:

generate, prior to associating the second access token with the set of storage locations, an initial access token of the plurality of tokens in response to the initial device oriented, block based command to store the set of data in the data storage system;

provide a first copy of the initial access token as the first access token to the host over the network connection; and provide a second copy of the initial access token as the second access token to the data storage assembly.

4. The data storage system of claim 1, wherein the device oriented, block based command is one of a read request to read data from at least one of the set of storage locations and a write request to write data to at least one of the set of storage locations.

5. The data storage system of claim 1, wherein the network connection is a local area network such that the data storage system forms a storage area network.

6. In a data storage system having a set of storage locations, a method for accessing a set of data stored in the set of storage locations, comprising the steps of:

receiving from a host (i) a device oriented, block based command to access the set of data stored in the set of storage locations and (ii) a first access token that provides access to the set of data stored in the set of storage locations;

generating an authorization signal that controls access to the set of data based on the first access token and a second access token associated with the set of storage locations, by comparing the first access token to the second access token associated with the set of storage locations, if the comparing step indicates that the first access token and the second access token are identical, producing an access approval signal that provides access to the set of storage locations; and if the comparing step indicates that the first access token and the second access token are not identical, producing an access failure signal that indicates a denial of access to the set of storage locations; and producing a response signal that provides a response to the device oriented, block based command to the host based on the authorization signal, wherein, when receiving, receiving from the host the first access token that provides access to the set of data stored within a range of disk addresses in the set of storage locations of the data storage assembly, the range of disk addresses distinct from file names associated with the set of data; and when generating, generate an authorization signal that controls access to the set of data based on the first access token and the second access token, the second access token associated with the range of disk addresses in the set of storage locations.

7. The method of claim 6, further comprising the steps of:

prior to the step of receiving the first access token, associating the second access token with the set of storage locations in response to an initial device oriented, block based command from the host to store the set of data;

allocating the set of storage locations in the data storage assembly to receive the set of data in response to the initial device oriented, block based command to store the set of data, while tagging each storage location with the second access token; and providing to the host the set of storage locations and the first access token based on the second access token.

8. The method of claim 7, further comprising the steps of:

prior to the step of associating the second access token with the set of storage locations, generating an initial access token in response to the initial device oriented, block based command to store the set of data in the data storage system; and providing a first copy of the initial access token as the first access token to the host that initiates the device oriented, block based command; and providing a second copy of the initial access token as the second access token.

9. The method of claim 6, wherein the step of receiving the first access token and the device oriented, block based command comprises receiving one of a read request to read data from at least one of the set of storage locations and a write request to write data to at least one of the set of storage locations.

10. The method of claim 6, wherein the data storage system is a storage area network comprising a data access manager and at least one data storage assembly comprising storage devices.

11. A computer program product that includes a computer readable medium having instructions stored thereon for accessing a set of data, such that the instructions, when carried out by a data storage system having a set of storage locations storing the set of data, cause the data storage system to perform the steps of:

receiving from a host (i) a device oriented, block based command to access the set of data stored in the set of storage locations and (ii) a first access token that provides access to the set of data stored in the set of storage locations;

generating an authorization signal that controls access to the set of data based on the first access token and a second access token associated with the set of storage locations, by comparing the first access token to the second access token associated with the set of storage locations, if the comparing step indicates that the first access token and the second access token are identical, producing an access approval signal that provides access to the set of storage locations; and if the comparing step indicates that the first access token and the second access token are not identical, producing an access failure signal that indicates a denial of access to the set of storage locations; and produce a response signal that provides a response to the device oriented, block based command to the host based on the authorization signal, wherein, when receiving, receiving from the host the first access token that provides access to the set of data stored within a range of disk addresses in the set of storage locations of the data storage assembly, the range of disk addresses distinct from file names associated with the set of data; and when generating, generating an authorization signal that controls access to the set of data based on the first access token and the second access token, the second access token associated with the range of disk addresses in the set of storage locations.

12. A data storage assembly for accessing a set of data, comprising:

a set of storage locations that stores the set of data; and a control circuit in communication with the set of storage locations, the control circuit configured to:

receive from a host in communication with the control circuit over a network connection (i) a device oriented, block based command to access the set of data and (ii) a first access token that provides access to the set of data stored in the set of storage locations;

generate an authorization signal that controls access to the set of data based on the first access token and a second access token associated with the set of storage locations, by comparing the first access token to the second access token associated with the set of storage locations, if the comparison indicates that the first access token and the second access token are identical, produce an access approval signal that provides access to the set of storage locations; and if the comparison indicates that the first access token and the second access token are not identical, produce an access failure signal that indicates a denial of access to the set of storage locations; and produce a response signal that provides a response to the device oriented, block based command over the network connection to the host based on the authorization signal, wherein, when receiving, the control circuit is configured to receive from the host in communication with a data access manager over the network connection the first access token that provides access to the set of data stored within a range of disk addresses in the set of storage locations of the data storage assembly, the range of disk addresses distinct from file names associated with the set of data; and when generating, generate an authorization signal that controls access to the set of data based on the first access token and the second access token, the second access token associated with the range of disk addresses in the set of storage locations.

13. The data storage assembly of claim 12, wherein the device oriented, block based command is one of a read request to read data from at least one of the set of storage locations and a write request to write data to at least one of the set of storage locations.

14. In a data storage assembly having a set of storage locations, a method for accessing a set of data stored in the set of storage locations, comprising the steps of:

receiving from a host (i) a device oriented, block based command to access the set of data stored in the set of storage locations and (ii) a first access token that provides access to the set of data stored in the set of storage locations;

generating an authorization signal that controls access to the set of data based on the first access token and a second access token associated with the set of storage locations, by comparing the first access token to the second access token associated with the set of storage locations, if the comparing step indicates that the first access token and the second access token are identical, producing an access approval signal that provides access to the set of storage locations; and if the comparing step indicates that the first access token and the second access token are not identical, producing an access failure signal that indicates a denial of access to the set of storage locations; and producing a response signal that provides a response to the device oriented, block based command to the host based on the authorization signal, wherein, when receiving, receiving from the host the first access token of the plurality of tokens that provides access to the set of data stored within a range of disk addresses in the set of storage locations of the data storage assembly, the range of disk addresses distinct from file names associated with the set of data; and when generating, generate an authorization signal that controls access to the set of data based on the first access token and the second access token, the second access token associated with the range of disk addresses in the set of storage locations.

15. The method of claim 14, wherein the step of receiving the first access token and the device oriented, block based command comprises receiving one of a read request to read data from at least one of the set of storage locations and a write request to write data to at least one of the set of storage locations.

16. A computer program product that includes a computer readable medium having instructions stored thereon for accessing a set of data, such that the instructions, when carried out by a data storage assembly having a set of storage locations that store the set of data, cause the data storage assembly to perform the steps of:
   receiving from a host (i) a device oriented, block based command to access the set of data stored in the set of storage locations and (ii) a first access token that provides access to the set of data stored in the set of storage locations;
   generating an authorization signal that controls access to the set of data based on the first access token and a second access token associated with the set of storage locations, by comparing the first access token to the second access token associated with the set of storage locations,
      if the comparing step indicates that the first access token and the second access token are identical, producing an access approval signal that provides access to the set of storage locations; and
      if the comparing step indicates that the first access token and the second access token are not identical, producing an access failure signal that indicates a denial of access to the set of storage locations; and
   producing a response signal that provides a response to the device oriented, block based command to the host based on the authorization signal,
   wherein, when receiving, receiving from the host the first access token of the plurality of tokens that provides access to the set of data stored within a range of disk addresses in the set of storage locations of the data storage assembly, the range of disk addresses distinct from file names associated with the set of data; and
   when generating, generate an authorization signal that controls access to the set of data based on the first access token and the second access token, the second access token associated with the range of disk addresses in the set of storage locations.

17. A data access system for providing access to a set of data, comprising:
   a host comprising (i) a memory having a host application, (ii) an input/output controller, and (iii) a processor in communication with the memory and the input/output controller, wherein the processor operates in accordance with instructions of the host application stored in the memory to request access to the set of data;
   a network connection in communication with the host; and
   a data storage assembly in communication with the network connection, the data storage assembly comprising (i) a set of storage locations that stores the set of data, and (ii) a control circuit, wherein:
      the processor of the host operates in accordance with the host application to provide to the data storage assembly through the input/output controller of the host and the network connection (i) a device oriented, block based command to access the set of data and (ii) a first access token of a plurality of tokens that provides access to the set of data stored in the set of storage locations in the data storage assembly;
      the control circuit of the data storage assembly is configured to receive over the network connection (i) the device oriented, block based command to access the set of data and (ii) the first access token provided by the host;
      the control circuit is configured to generate, in response to receiving the device oriented, block based command and the first access token, an authorization signal that controls access to the set of data based on the first access token and a second access token of the plurality of tokens, the second access token associated with the set of storage locations, by comparing the first access token to the second access token associated with the set of storage locations,
         if the comparing step indicates that the first access token and the second access token are identical, producing an access approval signal that provides access to the set of storage locations; and
         if the comparing step indicates that the first access token and the second access token are not identical, producing an access failure signal that indicates a denial of access to the set of storage locations; and
      the control circuit is configured to produce a response signal that provides a response to the device oriented, block based command over the network connection to the host based on the authorization signal,
      wherein, when receiving, the control circuit is configured to receive from the host over the network connection the first access token of the plurality of tokens that provides access to the set of data stored within a range of disk addresses in the set of storage locations of the data storage assembly, the range of disk addresses distinct from file names associated with the set of data; and
      when generating, generate an authorization signal that controls access to the set of data based on the first access token and the second access token of the plurality of tokens, the second access token associated with the range of disk addresses in the set of storage locations.

18. The data access system of claim 1, further comprising a data access manager in communication with the network connection, the data access manager comprising a processor and a memory that stores a data access manager application, wherein the processor operates in accordance with instructions of the data access manager application stored in the memory to establish the plurality of tokens for accessing the set of data, and wherein the instructions of the data access manager application configure the processor to:
   associate, prior to receiving the first access token, the second access token with the set of storage locations in response to an initial device oriented, block based command from the host to store the set of data;
   allocate the set of storage locations in the data storage assembly to receive the set of data in response to the initial device oriented, block based command to store the set of data, while tagging each storage location with the second access token; and
   provide to the host the set of storage locations and the first access token based on the second access token.

19. In a data access system having a host and a data storage assembly having a set of storage locations, a method for providing access to a set of data stored in the set of storage locations, comprising the steps of:

providing to the data storage assembly from the host (i) a device oriented, block based command to access the set of data and (ii) a first access token of a plurality of tokens that provides access to the set of data stored in the set of storage locations in the data storage assembly;

generating, in response to receiving the device oriented, block based command and the first access token, an authorization signal that controls access to the set of data based on the first access token and a second access token of the plurality of tokens, the second access token associated with the set of storage locations, by comparing the first access token to the second access token associated with the set of storage locations,
- if the comparing step indicates that the first access token and the second access token are identical, producing an access approval signal that provides access to the set of storage locations; and
- if the comparing step indicates that the first access token and the second access token are not identical, producing an access failure signal that indicates a denial of access to the set of storage locations; and producing a response signal that provides a response to the device oriented, block based command from the data storage assembly to the host based on the authorization signal, wherein, when receiving, receiving from the host the first access token of the plurality of tokens that provides access to the set of data stored within a range of disk addresses in the set of storage locations of the data storage assembly, the range of disk addresses distinct from file names associated with the set of data; and when generating, generate an authorization signal that controls access to the set of data based on the first access token and the second access token of the plurality of tokens, the second access token associated with the range of disk addresses in the set of storage locations.

20. The method of claim 19, wherein the data access system further comprises a data access manager, and the method further comprises the steps of:
- associating, prior to receiving the first access token, the second access token with the set of storage locations in response to an initial device oriented, block based command from the host to the data access manager to store the set of data;
- allocating the set of storage locations in the data storage assembly to receive the set of data in response to the initial device oriented, block based command to store the set of data, while tagging each storage location with the second access token; and
- providing to the host from the data access manager the set of storage locations and the first access token based on the second access token.

21. The data storage system of claim 1 wherein the device oriented, block based command comprises a SCSI command, the control circuit is configured to receive the SCSI command via non-channel communications using a transport protocol.

22. A data storage system for accessing a set of data, comprising:
- a data access manager for establishing a plurality of tokens for accessing the set of data;
- a network connection in communication with the data access manager; and
- a data storage assembly in communication with the network connection, the data storage assembly comprising (i) a set of storage locations that stores the set of data, and (ii) a control circuit configured to:
  - receive from a host in communication with the data access manager over the network connection (i) a device oriented, block based command to access the set of data and (ii) a first access token of the plurality of tokens that provides access to the set of storage locations within a range of disk addresses in the set of storage locations in the data storage system, the range of disk addresses distinct from file names associated with the set of data;
  - generate an authorization signal that controls access to the set of storage locations based on the first access token and a second access token of the plurality of tokens, the second access token associated with the range of disk addresses in the set of storage locations; and
  - produce a response signal that provides a response to the device oriented, block based command over the network connection to the host based on the authorization signal, wherein, when receiving, the control circuit is configured to receive from the host in communication with the data access manager over the network connection the first access token of the plurality of tokens that provides access to the set of data stored within a range of disk addresses in the set of storage locations of the data storage assembly, the range of disk addresses distinct from file names associated with the set of data; and when generating, generate an authorization signal that controls access to the set of data based on the first access token and the second access token of the plurality of tokens, the second access token associated with the range of disk addresses in the set of storage locations.

23. The data storage system of claim 1 wherein:
the set of storage locations of the data storage assembly comprises a range of disk addresses that stores the set of data, the control circuit configured to:
- receive from the host in communication with the data access manager over the network connection (i) the device oriented, block based command to access the set of data and (ii) a first access token of the plurality of tokens that provides access to the set of data stored in the range of disk addresses;
- generate the authorization signal that controls access to the set of data based on the first access token and a second access token of the plurality of tokens, the second access token associated with the set of storage locations, by performing a comparison of the first access token to the second access token associated with the set of storage locations,
  - if the comparison indicates that the first access token and the second access token are identical, produce the access approval signal that provides access to the range of disk addresses; and
  - if the comparison indicates that the first access token and the second access token are not identical, produce the access failure signal that indicates a denial of access to the range of disk addresses.

24. The data storage system of claim 1 wherein the control circuit is configured to receive, from the host, the device oriented, block based command to access the set of data and wherein the device oriented, block based command comprises one or more ranges of disk addresses of the set of storage locations.

25. The method of claim 6 wherein receiving from the host the device oriented, block based command comprises receiving from the host the device oriented, block based command having one or more ranges of disk addresses of the set of storage locations.

26. The computer program product of claim 11 wherein receiving from the host the device oriented, block based command to access the set of data stored in the set of storage locations comprises receiving from the host one or more ranges of disk addresses of the set of storage locations to access the set of data stored in the set of storage locations.

27. A data storage system for accessing a set of data, comprising:
   a data access manager for establishing a plurality of tokens for accessing the set of data;
   a network connection in communication with the data access manager; and
   a data storage assembly in communication with the network connection, the data storage assembly comprising (i) a set of storage locations having a range of disk addresses that stores the set of data, and (ii) a control circuit configured to:
      receive from the host in communication with the data access manager over the network connection (i) a device oriented, block based command to access the set of data, the device oriented, block based command comprising one or more ranges of disk addresses of the set of storage locations and (ii) a first access token of the plurality of tokens that provides access to the set of data stored in the range of disk addresses;
      generate an authorization signal that controls access to the set of data based on the first access token and a second access token of the plurality of tokens, the second access token associated with the set of storage locations, by performing a comparison of the first access token to the second access token associated with the set of storage locations;
      if the comparison indicates that the first access token and the second access token are identical, produce an access approval signal that provides access to the set of storage locations; and
      if the comparison indicates that the first access token and the second access token are not identical, produce an access failure signal that indicates a denial of access to the set of storage locations; and
   produce a response signal that provides a response to the device oriented, block based command over the network connection to the host based on the authorization signal;
   wherein the device oriented, block based command comprises a SCSI command and the control circuit is configured to receive the SCSI command via non-channel communications using a transport protocol,
   wherein, when receiving, the control circuit is configured to receive from the host in communication with the data access manager over the network connection the first access token of the plurality of tokens that provides access to the set of data stored within a range of disk addresses in the set of storage locations of the data storage assembly, the range of disk addresses distinct from file names associated with the set of data; and
   when generating, generate an authorization signal that controls access to the set of data based on the first access token and the second access token of the plurality of tokens, the second access token associated with the range of disk addresses in the set of storage locations.

* * * * *